(12) United States Patent
Ellis et al.

(10) Patent No.: US 11,420,514 B2
(45) Date of Patent: Aug. 23, 2022

(54) MULTISPEED TRANSAXLE WITH SPRUNG POWERTRAIN MOUNTING AND METHODS THEREFOR

(71) Applicant: ALLISON TRANSMISSION, INC., Indianapolis, IN (US)

(72) Inventors: Jason Ellis, Clayton, IN (US); Kyle Mason, Avon, IN (US); George Pelton, Indianapolis, IN (US); John Tysman, Zionsville, IN (US)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 119 days.

(21) Appl. No.: 16/928,235

(22) Filed: Jul. 14, 2020

(65) Prior Publication Data

US 2022/0016970 A1 Jan. 20, 2022

(51) Int. Cl.
*B60K 17/04* (2006.01)
*B60K 7/00* (2006.01)

(52) U.S. Cl.
CPC .......... *B60K 7/0007* (2013.01); *B60K 17/043* (2013.01); *B60K 2007/0046* (2013.01)

(58) Field of Classification Search
CPC ...... B60K 17/00; B60K 17/36; B60K 17/043; B60K 17/04; B60K 17/08; B60K 17/16; B60K 17/165; B60K 1/00; B60G 11/04; B60G 2200/32; B60G 2200/322; B60G 2204/15; B60G 2204/19; B60G 9/025
See application file for complete search history.

(56) References Cited

U.S. PATENT DOCUMENTS

| 562,289 A | 6/1896 | De Dion et al. |
| 1,117,700 A | 11/1914 | Piggins |
| 2,102,923 A | 12/1937 | Szekely |
| 4,057,121 A | 11/1977 | Stedman |

(Continued)

FOREIGN PATENT DOCUMENTS

| CN | 205818906 U | 12/2016 |
| FR | 2974039 A1 | 10/2012 |

(Continued)

OTHER PUBLICATIONS

International Search Report; ISA/US, Commissioner for Patents; International Application No. PCT/US2021/041247; dated Nov. 17, 2021; 2 pages.

(Continued)

*Primary Examiner* — James A English
(74) *Attorney, Agent, or Firm* — Taft Stettinius & Hollister LLP; Stephen F. Rost

(57) ABSTRACT

Vehicles, powertrains for vehicles, and methods of mounting powertrains to chassis of vehicles are disclosed herein. A vehicle includes a chassis, a plurality of wheels, and a powertrain. The chassis extends along a longitudinal axis from a first end to a second end arranged opposite the first end. The plurality of wheels are coupled to the chassis between the first end and the second end and configured for rotation about a rotational axis. The powertrain is mounted to the chassis transverse to the longitudinal axis between the first end and the second end. The powertrain is configured to drive rotation of the plurality of wheels about the rotational axis in use of the vehicle.

20 Claims, 7 Drawing Sheets

(56) References Cited

U.S. PATENT DOCUMENTS

| | | | |
|---|---|---|---|
| 4,148,262 A | 4/1979 | Eichinger | |
| 4,278,028 A | 7/1981 | Eichinger et al. | |
| 4,343,375 A | 8/1982 | Manning | |
| 6,598,691 B2* | 7/2003 | Mita | B60L 50/66 |
| | | | 180/65.1 |
| 6,973,982 B2* | 12/2005 | Yoshikawa | B60K 1/00 |
| | | | 180/65.6 |
| 7,588,117 B2* | 9/2009 | Fukuda | B60L 3/0007 |
| | | | 180/291 |
| 7,980,350 B2 | 7/2011 | Oriet et al. | |
| 8,733,492 B2* | 5/2014 | Tachibana | B62D 21/11 |
| | | | 180/299 |
| 9,821,647 B2 | 11/2017 | Martina et al. | |
| 10,556,617 B2 | 2/2020 | Wang et al. | |
| 2009/0014223 A1 | 1/2009 | Jones et al. | |
| 2011/0132676 A1* | 6/2011 | Kodaira | B62D 25/20 |
| | | | 180/65.51 |
| 2014/0209397 A1 | 7/2014 | Wolf | |
| 2015/0375783 A1* | 12/2015 | Yamamoto | B62D 9/002 |
| | | | 180/253 |
| 2016/0368359 A1 | 12/2016 | Rawte et al. | |
| 2021/0078397 A1* | 3/2021 | Ito | B60K 1/00 |

FOREIGN PATENT DOCUMENTS

| | | | | |
|---|---|---|---|---|
| GB | 2347398 A | 9/2000 | | |
| WO | 2011076534 A1 | 6/2011 | | |
| WO | 2019021965 A1 | 1/2019 | | |
| WO | 2019044262 A1 | 3/2019 | | |
| WO | WO-2019044262 A1 * | 3/2019 | | B60G 11/04 |
| WO | 2019094693 A1 | 5/2019 | | |

OTHER PUBLICATIONS

Written Opinion of the International Searching Authority; ISA/US, Commissioner for Patents; International Application No. PCT/US2021/041247; dated Nov. 17, 2021; 7 pages.

* cited by examiner

MULTISPEED TRANSAXLE WITH SPRUNG POWERTRAIN MOUNTING AND METHODS THEREFOR

FIELD OF THE DISCLOSURE

The present disclosure relates, generally, to powertrain configurations for vehicles, and, more specifically, to powertrain configurations for electric vehicles.

BACKGROUND

A powertrain incorporated into a vehicle may include one or more drive unit(s) and a transaxle coupled to the one or more drive unit(s). In some configurations, one or more components of the transaxle may be subjected to vibrational loads applied to wheels of the vehicle in use thereof. Minimizing vibration of transaxle components of a powertrain therefore remains an area of interest.

SUMMARY

The present disclosure may comprise one or more of the following features and combinations thereof.

According to one aspect of the present disclosure, a vehicle may include a chassis, a plurality of wheels, and a powertrain. The chassis may extend along a longitudinal axis from a first end to a second end arranged opposite the first end. The plurality of wheels may be coupled to the chassis between the first end and the second end and configured for rotation about a rotational axis. The powertrain may be mounted to the chassis transverse to the longitudinal axis between the first end and the second end and configured to drive rotation of the plurality of wheels about the rotational axis in use of the vehicle. The powertrain may include a drive unit to generate rotational power and a transaxle coupled to the drive unit to receive rotational power therefrom and transmit rotational power to the plurality of wheels. The transaxle may include a transmission and an axle assembly coupled to the transmission having a plurality of drive shafts that extend along the rotational axis and are each coupled to one of the plurality of wheels. The transmission may be spaced from the rotational axis to isolate the transmission from vibrational loads transmitted to the axle assembly in use of the vehicle.

In some embodiments, the drive unit may include an electric motor and the transmission may include transmission gearing, and the electric motor and the transmission gearing may be at least partially enclosed by a common housing that is spaced from the rotational axis to isolate the transmission gearing and the electric motor from vibrational loads transmitted to the axle assembly in use of the vehicle. The powertrain may include an inverter coupled to the housing such that the inverter is spaced from the rotational axis to isolate the inverter from vibrational loads transmitted to the axle assembly in use of the vehicle. Additionally, in some embodiments, the housing may be mounted to the chassis by a sub-frame, and the sub-frame may include a first mount plate affixed to one side of the housing and the chassis and a second mount plate affixed to another side of the housing opposite the one side and the chassis.

In some embodiments, the transaxle may include a differential coupled to the transmission and the plurality of drive shafts of the axle assembly to transmit rotational power from the transmission to the axle assembly, and the differential may be housed by a dropbox that extends all the way around the rotational axis. The dropbox may be coupled to a housing that at least partially encloses the drive unit and the transmission, and the dropbox and the housing may be separate components. Additionally, in some embodiments, the drive unit and the transmission may at least partially contribute to a sprung mass of the powertrain, and the axle assembly may at least partially contribute to an unsprung mass of the powertrain.

In some embodiments, the axle assembly may include a first wheel mount block coupled to a first drive shaft of the plurality of drive shafts and a second wheel mount block coupled to a second drive shaft of the plurality of drive shafts, and each of the first and second wheel mount blocks may extend all the way around the rotational axis and be configured for interaction with one of the plurality of wheels. The vehicle may further comprise a suspension having a first suspension linkage mounted to the chassis and a second suspension linkage mounted to the chassis, and the first suspension linkage may contact the first wheel mount block and the second suspension linkage may contact the second wheel mount block. The suspension may include a beam coupled to the first and second wheel mount blocks that is at least partially offset from the rotational axis along the longitudinal axis of the chassis. Additionally, in some embodiments, the transaxle may include a differential coupled between the first and second drive shafts of the axle assembly that is at least partially arranged about the rotational axis.

According to another aspect of the present disclosure, a powertrain for a vehicle having a chassis that extends along a longitudinal axis from a first end to a second end arranged opposite the first end and a plurality of wheels coupled to the chassis between the first end and the second end that are configured for rotation about a rotational axis may include a drive unit and a transaxle. The drive unit may generate rotational power. The transaxle may be coupled to the drive unit to receive rotational power therefrom and transmit rotational power to the plurality of wheels. The transaxle may include a transmission and an axle assembly coupled to the transmission having a plurality of drive shafts that extend along the rotational axis and are each coupled to one of the plurality of wheels. The transmission may be positioned relative to the rotational axis to isolate the transmission from vibrational loads transmitted to the axle assembly in use of the powertrain.

In some embodiments, the drive unit may include an electric motor and the transmission may include transmission gearing, and the electric motor and the transmission gearing may be at least partially enclosed by a common housing that is positioned relative to the rotational axis to isolate the transmission gearing and the electric motor from vibrational loads transmitted to the axle assembly in use of the powertrain. The powertrain may further comprise an inverter coupled to the housing such that the inverter is positioned relative to the rotational axis to isolate the inverter from vibrational loads transmitted to the axle assembly in use of the powertrain. Additionally, in some embodiments, the transaxle may include a differential coupled to the transmission and the plurality of drive shafts of the axle assembly to transmit rotational power from the transmission to the axle assembly, and the differential may be housed by a dropbox that is coupled to the housing and extends all the way around the rotational axis.

In some embodiments, the axle assembly may include a first wheel mount block coupled to a first drive shaft of the plurality of drive shafts and a second wheel mount block coupled to a second drive shaft of the plurality of drive shafts, and each of the first and second wheel mount blocks may extend all the way around the rotational axis and be configured for interaction with one of the plurality of wheels. In use of the powertrain, each one of the first and second wheel mount blocks may contact a suspension linkage of a suspension of the vehicle.

According to yet another aspect of the present disclosure, a method of mounting a powertrain to a chassis of a vehicle may include mounting a drive unit of the powertrain and a transmission of the powertrain to the chassis such that the mounted drive unit and the mounted transmission are transverse to a longitudinal axis defined by the chassis, mounting an axle assembly of the powertrain to the chassis such that the mounted axle assembly is transverse to the longitudinal axis and at least partially aligned with a rotational axis of a plurality of wheels of the vehicle, and ensuring the mounted drive unit and the mounted transmission are positioned above the rotational axis in a vertical direction to isolate the mounted drive unit and the mounted transmission from vibrational loads transmitted to the axle assembly in use of the vehicle.

In some embodiments, mounting the drive unit of the powertrain and the transmission of the powertrain to the chassis may comprise mounting the drive unit and the transmission to the chassis with a sub-frame, and mounting the drive unit and the transmission to the chassis with the sub-frame may include affixing mount plates of the sub-frame to the chassis and a housing common to the drive unit and the transmission. Mounting the axle assembly of the powertrain to the chassis may comprise aligning wheel mount blocks and drive shafts of the axle assembly with the plurality of wheels along the rotational axis and affixing suspension linkages of a suspension of the vehicle to the wheel mount blocks.

These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
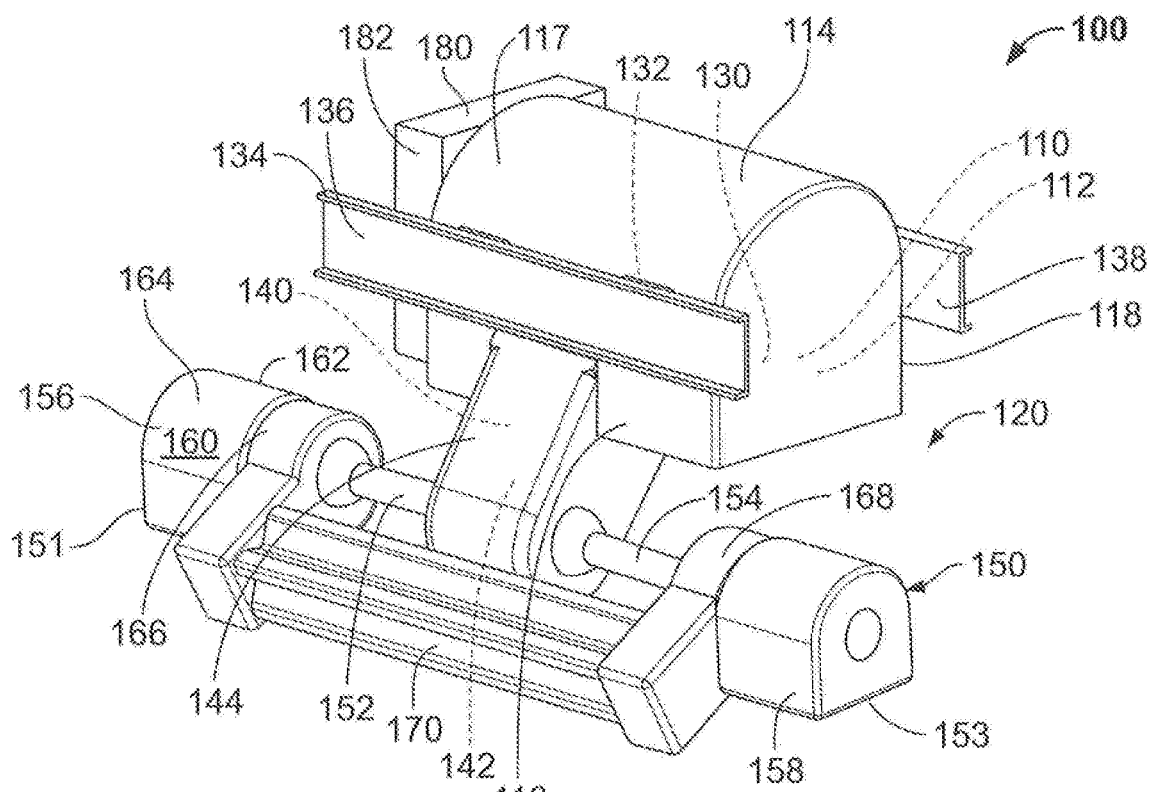
FIG. 1 is a perspective view of a powertrain adapted for use in a vehicle.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features, such as those representing devices, modules, instructions blocks and data elements, may be shown in specific arrangements and/or orderings for ease of description. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In some embodiments, schematic elements used to represent blocks of a method may be manually performed by a user. In other embodiments, implementation of those schematic elements may be automated using any suitable form of machine-readable instruction, such as software or firmware applications, programs, functions, modules, routines, processes, procedures, plug-ins, applets, widgets, code fragments and/or others, for example, and each such instruction may be implemented using any suitable programming language, library, application programming interface (API), and/or other software development tools. For instance, in some embodiments, the schematic elements may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others, for example.

Further, in the drawings, where connecting elements, such as solid or dashed lines or arrows, are used to illustrate a connection, relationship, or association between or among two or more other schematic elements, the absence of any such connection elements is not meant to imply that no connection, relationship, or association can exist. In other words, some connections, relationships, or associations between elements may not be shown in the drawings so as not to obscure the disclosure. In addition, for ease of illustration, a single connecting element may be used to represent multiple connections, relationships, or associations between elements. For example, where a connecting element represents a communication of signals, data or instructions, it should be understood by those skilled in the art that such element may represent one or multiple signal paths (e.g., a bus), as may be needed, to effect the communication.

Figure 2:
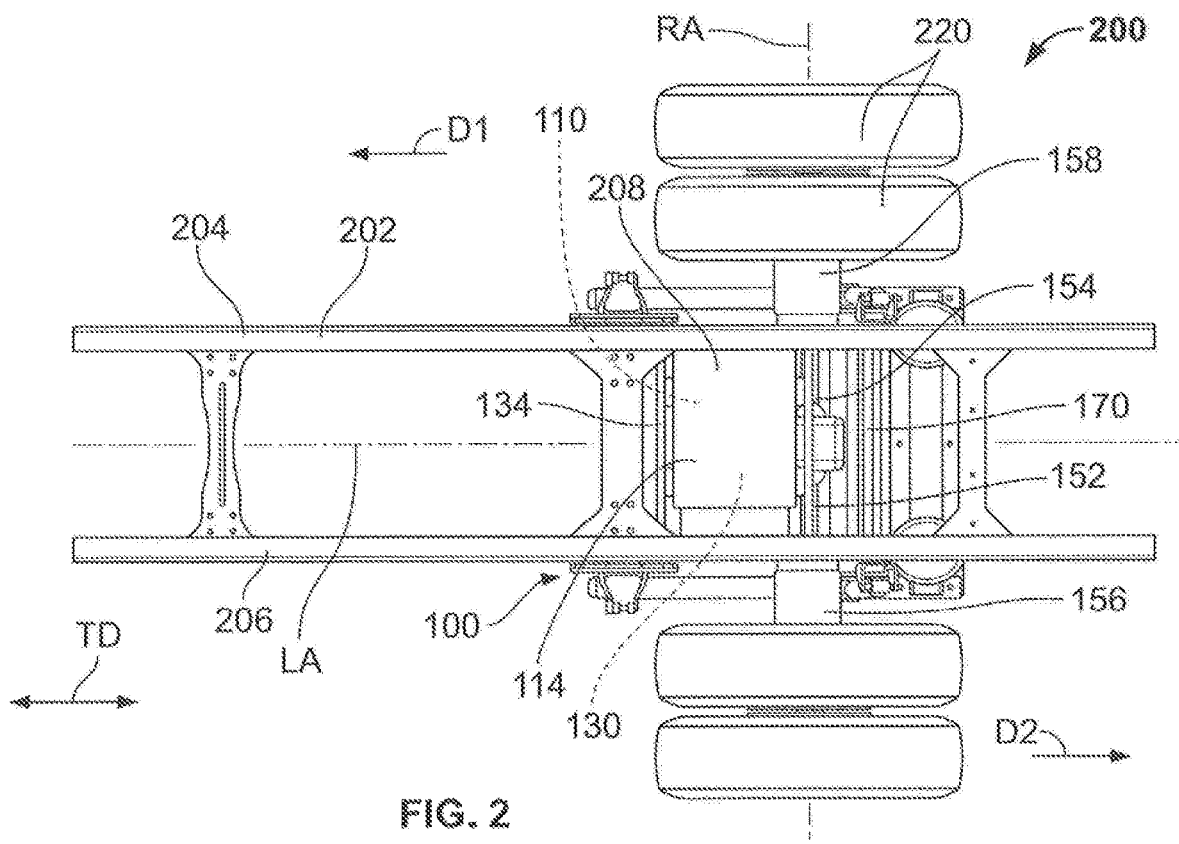
FIG. 2 is a top view of a vehicle that incorporates the powertrain of FIG. 1.

Referring now to FIGS. 1 and 2, an illustrative powertrain 100 (see FIG. 1) is adapted for use in a vehicle 200 (see FIG. 2). In the illustrative embodiment, the powertrain 100 is embodied as, or otherwise includes, a collection of devices that are cooperatively capable of generating and transmitting rotational power to wheels 220 of the vehicle 200 to propel the vehicle 200 in use thereof. As described below with reference to FIG. 2, the powertrain 100 is mounted to a chassis or main frame 202 of the vehicle 200 transverse to a longitudinal axis LA along which the chassis 202 extends. As a result, the powertrain 100 is arranged transverse to a travel direction TD of the vehicle 200, and the powertrain 100 may be said to have a transverse mounting arrangement relative to the chassis 202.

It should be appreciated that the illustrative vehicle 200, and the powertrain 100 included therein, may be employed in a variety of applications. In some embodiments, the vehicle 200 may be embodied as, or otherwise include, a fire and emergency vehicle, a refuse vehicle, a coach vehicle, a recreational vehicle or motorhome, a municipal and/or service vehicle, an agricultural vehicle, a mining vehicle, a specialty vehicle, an energy vehicle, a defense vehicle, a port service vehicle, a construction vehicle, and a transit and/or bus vehicle, just to name a few. Additionally, in some embodiments, the powertrain 100 may be adapted for use with, or otherwise incorporated into, tractors, front end loaders, scraper systems, cutters and shredders, hay and forage equipment, planting equipment, seeding equipment, sprayers and applicators, tillage equipment, utility vehicles, mowers, dump trucks, backhoes, track loaders, crawler loaders, dozers, excavators, motor graders, skid steers, tractor loaders, wheel loaders, rakes, aerators, skidders, bunchers, forwarders, harvesters, swing machines, knuckleboom loaders, diesel engines, axles, planetary gear drives, pump drives, transmissions, generators, and marine engines, among other suitable equipment.

In the illustrative embodiment, the powertrain 100 includes a drive unit 110 (shown in phantom in FIG. 1) to generate rotational power. The drive unit 110 may be embodied as, or otherwise include, any device or collection of devices capable of generating rotational power that may be transmitted to the wheels 220 to drive movement of the vehicle 200. The illustrative drive unit 110 is embodied as, or otherwise includes, one or more electric motors 112. Because the powertrain 100 incorporates one or more electric motors or powerplants, at least in some embodiments, the vehicle 200 is embodied as, or otherwise includes, an electric vehicle. In any case, operation of the drive unit 110 may be controlled by an engine control module (not shown) that includes one or more processors and one or more memory devices.

The illustrative powertrain 100 also includes a transaxle 120 coupled to the drive unit 110 to receive rotational power therefrom and transmit rotational power to the wheels 220. The transaxle 120 may be embodied as, or otherwise include, any collection of devices capable of receiving rotational power from the drive unit 110 and transmitting rotational power to the wheels 220. In the illustrative embodiment, the transaxle 120 includes a transmission 130 (shown in phantom in FIG. 1), a differential 140 (shown in phantom in FIG. 1) coupled to the transmission 130, and an axle assembly 150 coupled to the differential 140. The axle assembly 150 includes drive shafts 152, 154 that are each coupled to one of the wheels 220 and each extend along, and are aligned with, a rotational axis RA about which the wheels 220 rotate in use of the vehicle 200. The transmission 130 is spaced from, and thereby offset from, the rotational axis RA to isolate the transmission 130 from vibrational loads transmitted to the axle assembly 150 in use of the vehicle 200.

Figure 5:
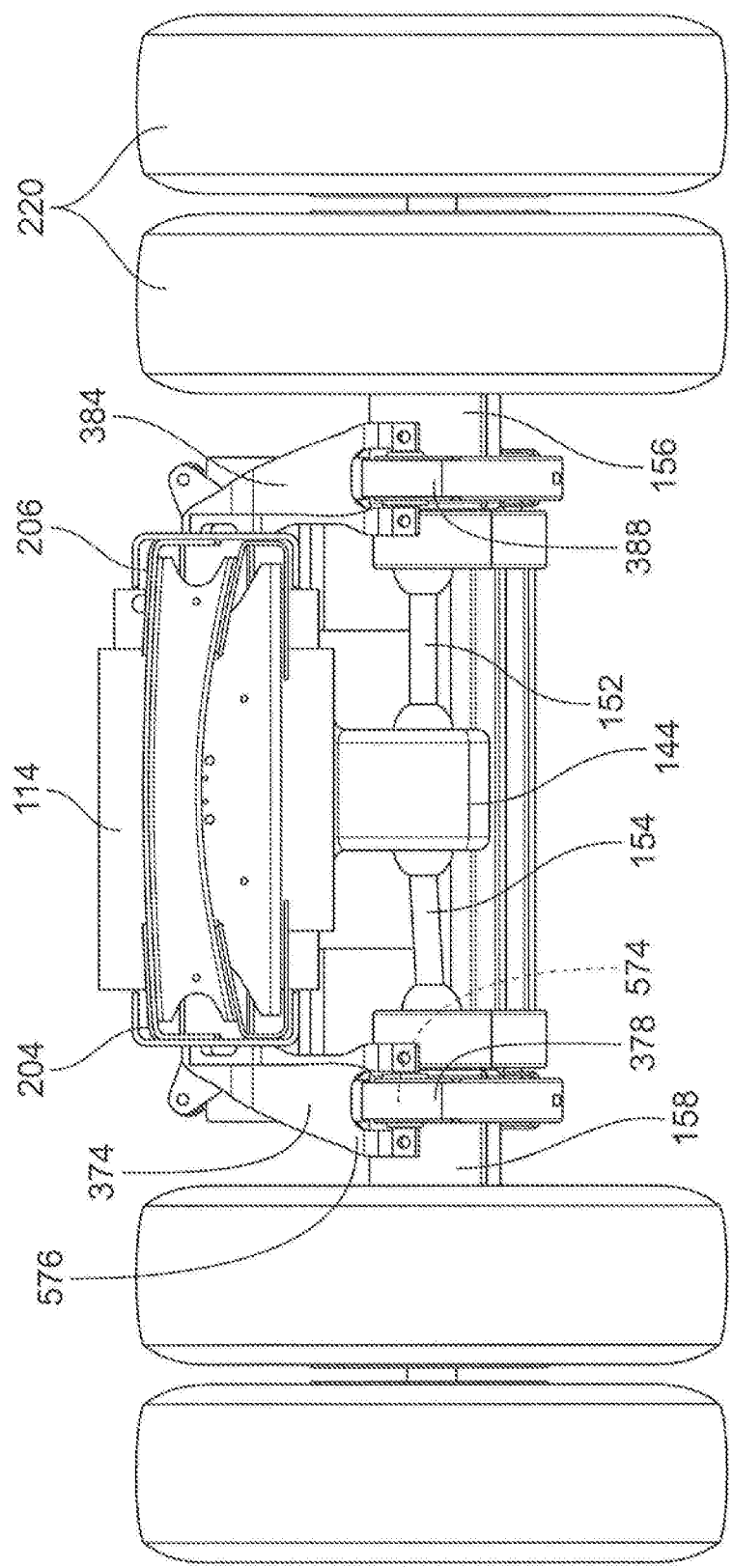
FIG. 5 is an elevation view of the vehicle of FIG. 2 taken from the front of the vehicle.
Figure 6:
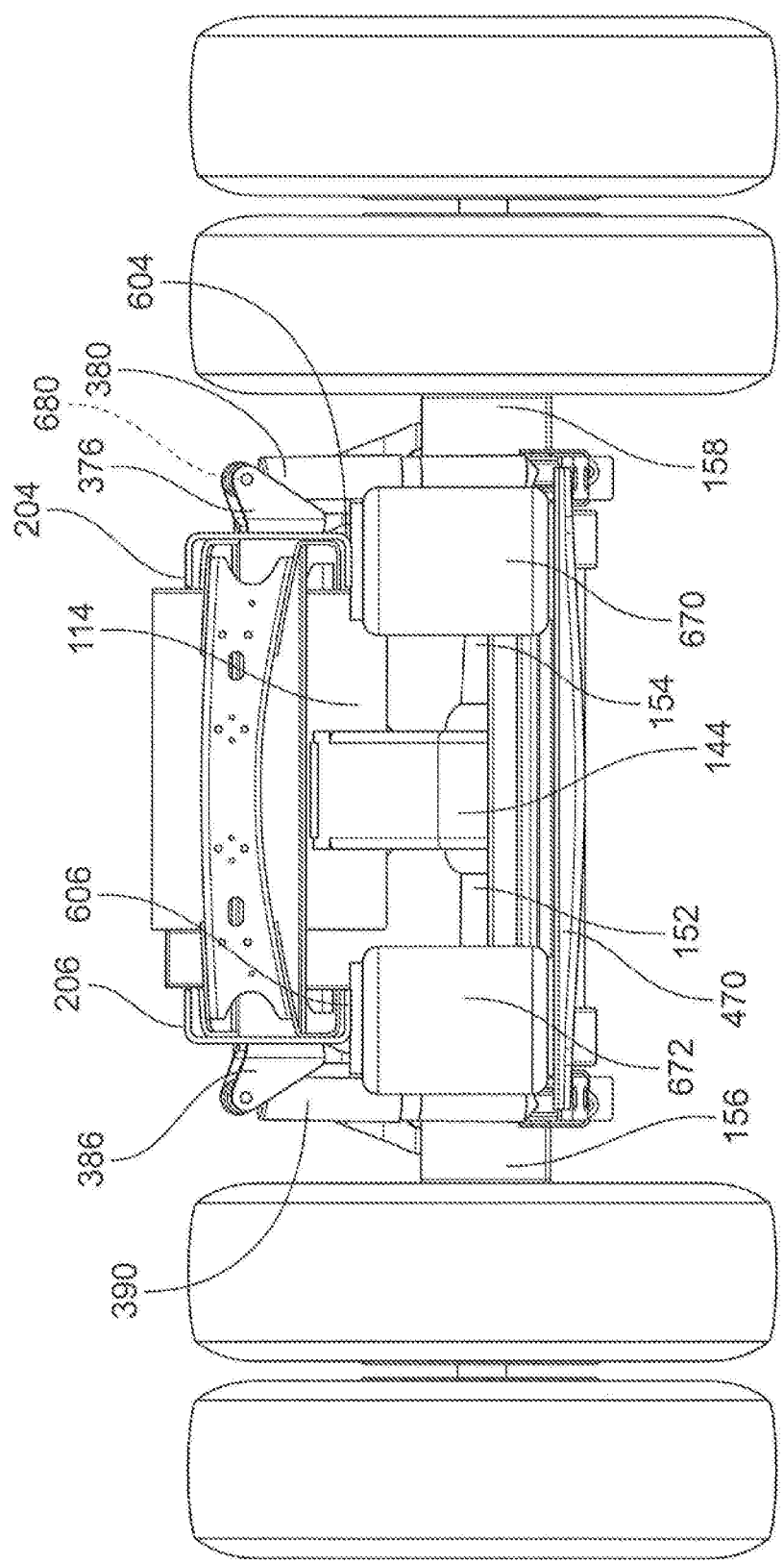
FIG. 6 is an elevation view of the vehicle of FIG. 2 taken from the rear of the vehicle.

In some embodiments, as depicted in FIGS. 1, 5, and 6, for example, the drive unit 110 and the transmission 130 are positioned directly above, and thereby offset from, the rotational axis RA in a vertical direction. Additionally, in some embodiments, the drive unit 110 and the transmission 130 may be spaced from the rotational axis RA along the longitudinal axis LA. Further, in some embodiments, the drive unit 110 and the transmission 130 may be positioned relative to the rotational axis RA to isolate the drive unit 110 and the transmission 130 from vibrational loads transmitted to the axle assembly 150 in use of the powertrain 100, as further discussed below. In such embodiments, the drive unit 110 and the transmission 130 may be mounted directly on the rotational axis RA or spaced from the rotational axis RA.

It should be appreciated that in use of a vehicle, vibrational loads applied to wheels of the vehicle (e.g., due to surface grade, surface composition, undulations, depressions, debris and/or foreign matter accumulation, etc.) may be transmitted to an axle coupled to the wheels. In some powertrain configurations, particularly configurations in which one or more drive unit(s) and/or transmission(s) are mounted in-line with an axle coupled to the wheels, the drive unit(s) and/or transmission(s) may be subjected to the vibrational loads transmitted from the wheels or tracks to the axle. Those powertrain configurations may be associated with undesirable vibration of various components of the drive unit(s) and/or transmission(s), such as one or more housings or casings, bearings, gears power electronics, and circuitry, for example.

In some powertrain configurations, in-line mounting of the one or more drive unit(s) and/or transmission(s) with the axle may increase the unsprung mass of the powertrain. For the purposes of the present disclosure, the unsprung mass of the powertrain refers to the mass of the powertrain that is directly connected to the suspension of the vehicle, whereas the sprung mass of the powertrain refers to the mass of the powertrain that is supported by the suspension of the vehicle. Increased unsprung mass may contribute to, or otherwise be associated with, reduced ride quality, reduced traction, and increased wheel hop, among other drawbacks.

In some powertrain configurations, movement of the vehicle suspension may complicate the routing of various electrical cables and/or fluid lines to components of the powertrain. For example, due to suspension travel, the routing of electrical cables and/or fluid lines to various powertrain components (e.g., power inverters, oil coolers, control modules, input/output interfaces, etc.) may require strain relief measures to be accounted for to avoid component failures, thereby introducing undesirable cost and design complexity.

In some powertrain configurations, such as those configurations incorporating an internal combustion engine, for example, a transaxle may require a hypoid or bevel gear to transmit torque to an axle. Inclusion of a hypoid or bevel gear may cause, or otherwise be associated with, reductions in performance efficiency and/or increases in design complexity due to shimming and backlash measurements.

In some powertrain configurations, transaxles may lack a desirable degree of modularity which complicates provision of those transaxles as modules capable of being mounted on a number of different vehicle chassis. Additionally, such transaxles may not be capable of provision with power electronics components, heat transfer components (e.g., oil coolers and/or coolers incorporating water ethylene glycol), and control modules (e.g., engine and/or transmission control modules) as modular, integrated packages configured for mounted on a number of different vehicle chassis.

In some powertrain configurations, transaxles may lack a desirable degree of compatibility with conventional vehicle components. For example, in some configurations, transaxles may not be well suited for use with conventional wheels, brakes, and suspension components employed across a number of vehicle platforms.

Finally, in some powertrain configurations, the packaging size of transaxles may complicate provision of sufficient space between frame rails of vehicle chassis to accommodate one or more power sources (e.g., one or more batteries to supply electrical power). Such powertrain configurations may be limited particularly in electric drive applications.

Due at least in part to the positioning of the drive unit 110 and the transmission 130 relative to the rotational axis RA, the illustrative powertrain 100 may avoid a number of the shortcomings associated with other powertrain configurations. In one respect, compared to configurations in which one or more drive unit(s) and/or transmission(s) are mounted in-line with an axle coupled to wheels, the powertrain 100 may provide, or otherwise be associated with, a reduced unsprung mass which may improve vehicle dynamics. In another respect, compared to configurations in which one or more drive unit(s) and/or transmission(s) are mounted in-line with an axle coupled to wheels, the powertrain 100 may provide, or otherwise be associated with, improved vibration isolation and enhanced power electronics durability. In yet another respect, compared to configurations in which one or more drive unit(s) and/or transmission(s) are mounted in-line with an axle coupled to wheels, the powertrain 100 may provide, or otherwise be associated with, decreased loads applied to housings or casings of various powertrain components. In yet another respect still, routing of various electrical cables and/or fluid lines to components of the powertrain 100 may be performed substantially without accounting for suspension travel. In a further respect, the powertrain 100 may omit the hypoid or bevel gear required in some applications and thereby provide, or otherwise be associated with, reduced design complexity and improved performance efficiency. In a further respect still, the powertrain 100 may be provided with power electronics components, heat transfer components (e.g., oil coolers and/or coolers incorporating water ethylene glycol), and control modules (e.g., engine and/or transmission control modules) as a modular, integrated package configured for installation in a number of different vehicle chassis. In a further respect yet still, the powertrain 100 may be configured for use with conventional wheels, brakes, and suspension components employed across a number of vehicle platforms. Finally, in a further respect, the powertrain 100 may provide, or otherwise be associated with, a packaging profile that allows space for one or more electrical power sources (not shown) to be accommodated between frame rails 204, 206 of the chassis 202.

Returning to FIG. 1, the illustrative transmission 130 is embodied as, or otherwise include, any device or collection of devices capable of transmitting rotational power supplied by the drive unit 110 to the differential 140 of the transaxle 120. The illustrative transmission 130 is embodied as, or otherwise includes, transmission gearing 132. Operation of the transmission 130 may be controlled by a transmission control module (not shown) that includes one or more processors and one or more memory devices.

In the illustrative embodiment, the drive unit 110 and the transmission 130 are at least partially enclosed by a common housing 114 that is sized to be positioned in a cutout 208 defined between the frame rails 204, 206 of the chassis 202. In some embodiments, the one or more electric motors 112 and the transmission gearing 132 are completely enclosed by the housing 114. In any case, when the housing 114 is mounted to the chassis 202 as shown in FIG. 2, the housing 114 is arranged transverse to the longitudinal axis LA. Additionally, when the housing 114 is mounted to the chassis 202, the housing 114 is spaced from, and offset from, the rotational axis RA. As such, the housing 114 and the components housed thereby (e.g., the one or more electric motors 112, the gearing 132, one or more bearings, one or more shafts, one or more clutches, circuitry and/or electrical hardware associated with the drive unit 110 and the transmission 130, etc.) are isolated from vibrational loads transmitted to the axle assembly 150 in use of the vehicle 200.

The housing 114 illustratively includes generally planar sides 116, 118 that are arranged opposite one another and an arcuate roof 117 that interconnects the sides 116, 118. In the illustrative embodiment, the housing 114 is mounted to the chassis 202 by a sub-frame 134. More specifically, a mount plate or panel 136 of the sub-frame 134 is affixed to the side 116 of the housing 114 and a mount plate or panel 138 of the sub-frame 134 is affixed to the side 118 of the housing 114. When the housing 114 is mounted to the chassis 202 via the sub-frame 134 as shown in FIG. 2, each of the mount plates 136, 138 is positioned in the cutout 208 and contacts the chassis 202. Additionally, when the housing 114 is mounted to the chassis 202 via the sub-frame 134, each of the mount plates 136, 138 is arranged transverse to the longitudinal axis LA.

It should be appreciated that in other embodiments, the sub-frame 134 may be omitted. In such embodiments, the housing 114 may be mounted directly to the chassis 202 and transverse to the longitudinal axis LA using one or more fasteners. Additionally, in such embodiments, the housing 114 may be formed to include features (e.g., mounting flanges, projections, tabs, or the like) to facilitate direct mounting of the housing 114 to the chassis 202.

Figure 4:
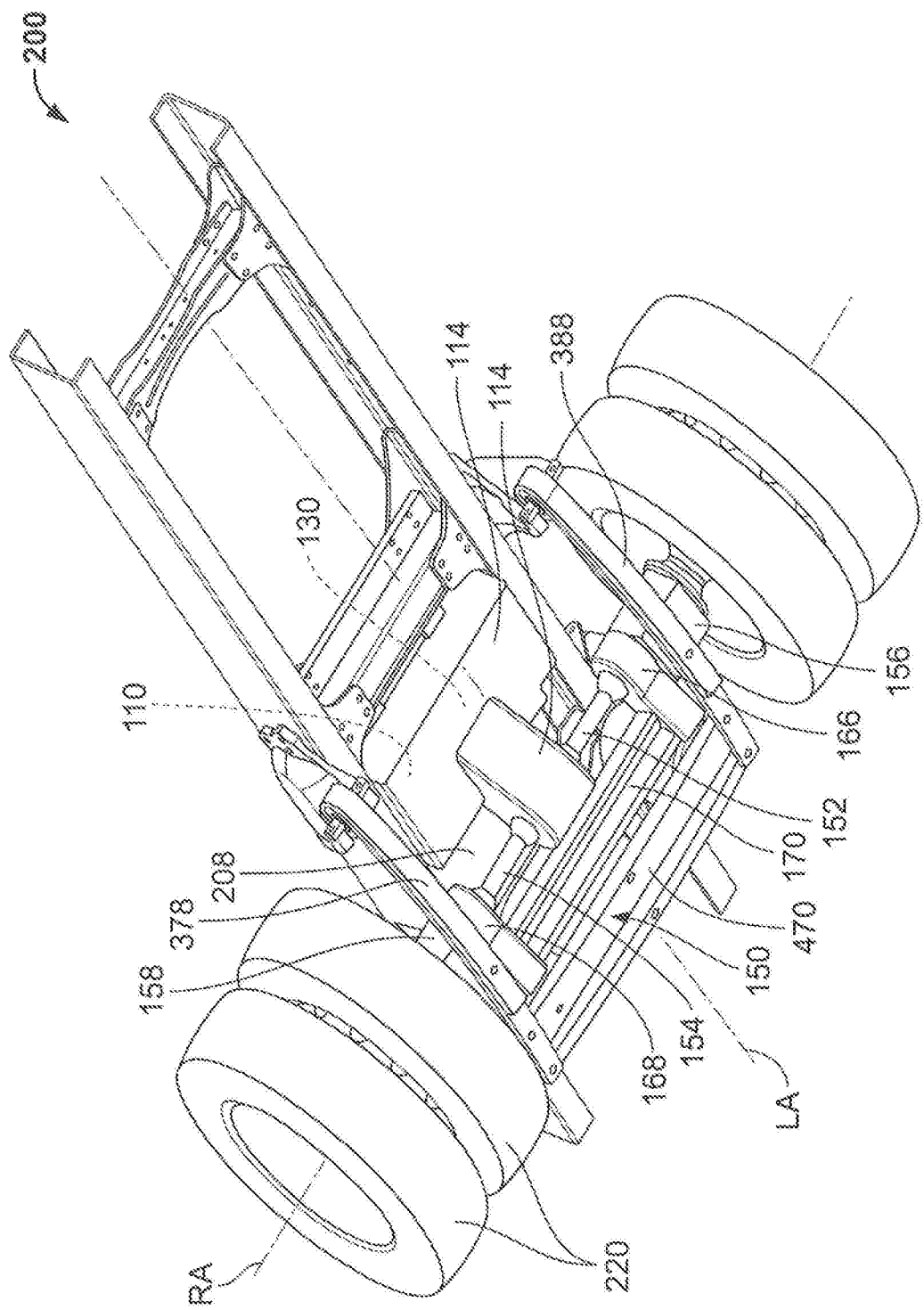
FIG. 4 is a perspective view of the vehicle of FIG. 2 taken from below the vehicle.

The illustrative differential 140 is embodied as, or otherwise includes, any device or collection of devices capable of being coupled between the drive shafts 152, 154 to transmit rotational power from the transmission 130 to the axle assembly 150. The illustrative differential 140 is embodied as, or otherwise includes, a differential gear train 142 that is coupled to the transmission 130 and the drive shafts 152, 154 of the axle assembly 150. In the illustrative embodiment, the differential 140 omits a hypoid or bevel gear that may be required in other powertrain configurations, such as in configurations incorporating one or more internal combustion engines as discussed above, for example. In any case, the differential 140 is housed by and includes a dropbox 144 that is coupled to, and extends outwardly away from, the housing 114. More specifically, as best seen in FIGS. 5 and 6, the dropbox 144 extends downwardly away from the housing 114 toward the drive shafts 152, 154 such that the dropbox 144 is at least partially arranged about the rotational axis RA. As best seen in FIG. 4, the dropbox 144 extends all the way around the rotational axis RA. In some embodiments, it should be appreciated that the dropbox 144 may be integrated with, or otherwise included in, the housing 114. In such embodiments, the drive unit 110, the transmission 130, and the differential 140 may be enclosed by a common housing.

In the illustrative embodiment, the housing 114 and the dropbox 144 are separate components that are coupled to one another. In other embodiments, however, the housing 114 and the dropbox 144 may be interconnected with one another and/or integrally formed with one another.

The illustrative axle assembly 150 includes the drive shafts 152, 154, a wheel mount block 156 coupled to the drive shaft 152, and a wheel mount block 158 coupled to the drive shaft 154. The drive shafts 152, 154 are each illustratively embodied as, or otherwise include, a half shaft that may be supported for rotation about the rotational axis RA by one or more bearings. In some embodiments, each of the drive shafts 152, 154 may be secured and/or supported for rotation about the rotational axis RA by one or more constant-velocity (CV) joints, such as one or more Tracta joints, Rzeppa joints, Weiss joints, Tripod joints, Double Cardan joints, Thompson CV joints, or Malpezzi joints, for example. In other embodiments, each of the drive shafts 152, 154 may be secured and/or supported for rotation about the rotational axis RA by one or more U-joints, universal couplings, Spicer joints, or Hooke's joints.

Each of the illustrative wheel mount blocks 156, 158 is configured for interaction with one of the wheels 220 (i.e., a central hub thereof) to transmit rotation thereto in use of the vehicle 200. The wheel mount blocks 156, 158 are substantially identical to one another and arranged at opposite ends 151, 153 of the axle assembly 150, respectively. Using the wheel mount block 156 as an example, the block 156 includes a planar face 160, a planar face 162 arranged opposite the planar face 160, and an arcuate surface 164 interconnecting the faces 160, 162. In some embodiments, the faces 160, 162 and the surface 164 may be formed as a continuous surface or segment. In other embodiments, of course, it should be appreciated that the faces 160, 162 and the surface 164 may be formed separately from one another. In any case, as best seen in FIG. 4, each of the wheel mount blocks 156, 158 illustratively extends all the way around the rotational axis RA. As described in greater detail below with reference to FIGS. 3 and 4, the wheel mount blocks 156, 158 are configured for direct interaction with components of a suspension 370 included in the vehicle 200.

In the illustrative embodiment, a suspension beam 170 is coupled to the wheel mount blocks 156, 158 and extends transverse to the longitudinal axis LA of the chassis 202 when the powertrain 100 is mounted to the chassis 202. The suspension beam 170 may be included in or coupled to the suspension 370. In any case, the suspension beam 170 is at least partially offset from the rotational axis RA along the longitudinal axis LA of the chassis 202. In the illustrative embodiment, when the powertrain 100 is mounted to the chassis 202, the housing 114 and the dropbox 144 are at least partially offset from the rotational axis RA along the longitudinal axis LA in a direction D1, and the suspension beam 170 is at least partially offset from the rotational axis RA along the longitudinal axis LA in a direction D2 that is opposite the direction D1. In other embodiments, however, it should be appreciated that the housing 114 and the dropbox 144 may have another suitable arrangement relative to the suspension beam 170.

The suspension beam 170 is illustratively embodied as, or otherwise includes, any structure capable of provision as a suspension component of an independent or non-independent suspension system. In the illustrative embodiment, the suspension beam 170 is embodied as, or otherwise includes, a de Dion tube that is not directly connected to the chassis 202. Additionally, in the illustrative embodiment, the suspension beam 170 is not configured for appreciable flexion and does not transmit rotational power to the wheels 220 in use of the vehicle 200. In other embodiments, however, it should be appreciated that the beam 170 may be embodied as, or otherwise include, another suitable device.

In the illustrative embodiment, a circular hub 166 is arranged in contact with the drive shaft 152, the wheel mount block 156, and the suspension beam 170. When the powertrain 100 is mounted to the chassis 202, the circular hub 166 is aligned with, and extends all the way around, the rotational axis RA. In some embodiments, the hub 166 may be formed separately from the wheel mount block 156 and the suspension beam 170 and affixed to at least one of the wheel mount block 156 and the suspension beam 170. In other embodiments, the hub 166 may be integrally formed with at least one of the wheel mount block 156 and the suspension beam 170. Additionally, in some embodiments, the hub 166 may not transmit rotational power to the wheels 220 in use of the vehicle 200.

In the illustrative embodiment, a circular hub 168 is arranged in contact with the drive shaft 154, the wheel mount block 158, and the suspension beam 170. When the powertrain 100 is mounted to the chassis 202, the circular hub 168 is aligned with, and extends all the way around, the rotational axis RA. In some embodiments, the hub 168 may be formed separately from the wheel mount block 158 and the suspension beam 170 and affixed to at least one of the wheel mount block 158 and the suspension beam 170. In other embodiments, the hub 168 may be integrally formed with at least one of the wheel mount block 158 and the suspension beam 170. Additionally, in some embodiments, the hub 168 may not transmit rotational power to the wheels 220 in use of the vehicle 200.

The illustrative powertrain 100 includes an inverter 180 having a casing 182 that is coupled to the housing 114. When the powertrain 100 is mounted to the chassis 202, the inverter 180 is coupled to the housing 114 such that the inverter 180 is spaced from, and offset from, the rotational axis RA to isolate the inverter 180 from vibrational loads transmitted to the axle assembly 150 in use of the vehicle 200. In some embodiments, the inverter 180 may be embodied as, or otherwise include, a power inverter capable of converting direct current (DC) to alternating current (AC). In such embodiments, the inverter 180 may be electrically coupled to an electrical power source such as a DC battery, for example, which may be accommodated between the frame rails 204, 206 of the chassis 202 when the powertrain 100 is mounted to the chassis 202. Of course, in other embodiments, it should be appreciated that the inverter 180 may be embodied as, or otherwise include, another suitable device. In some embodiments, it should be appreciated that the casing 182 may be integrated with, or otherwise included in, the housing 114. In such embodiments, the drive unit 110, the transmission 130, and the inverter 180 may be enclosed by a common housing.

Figure 3:
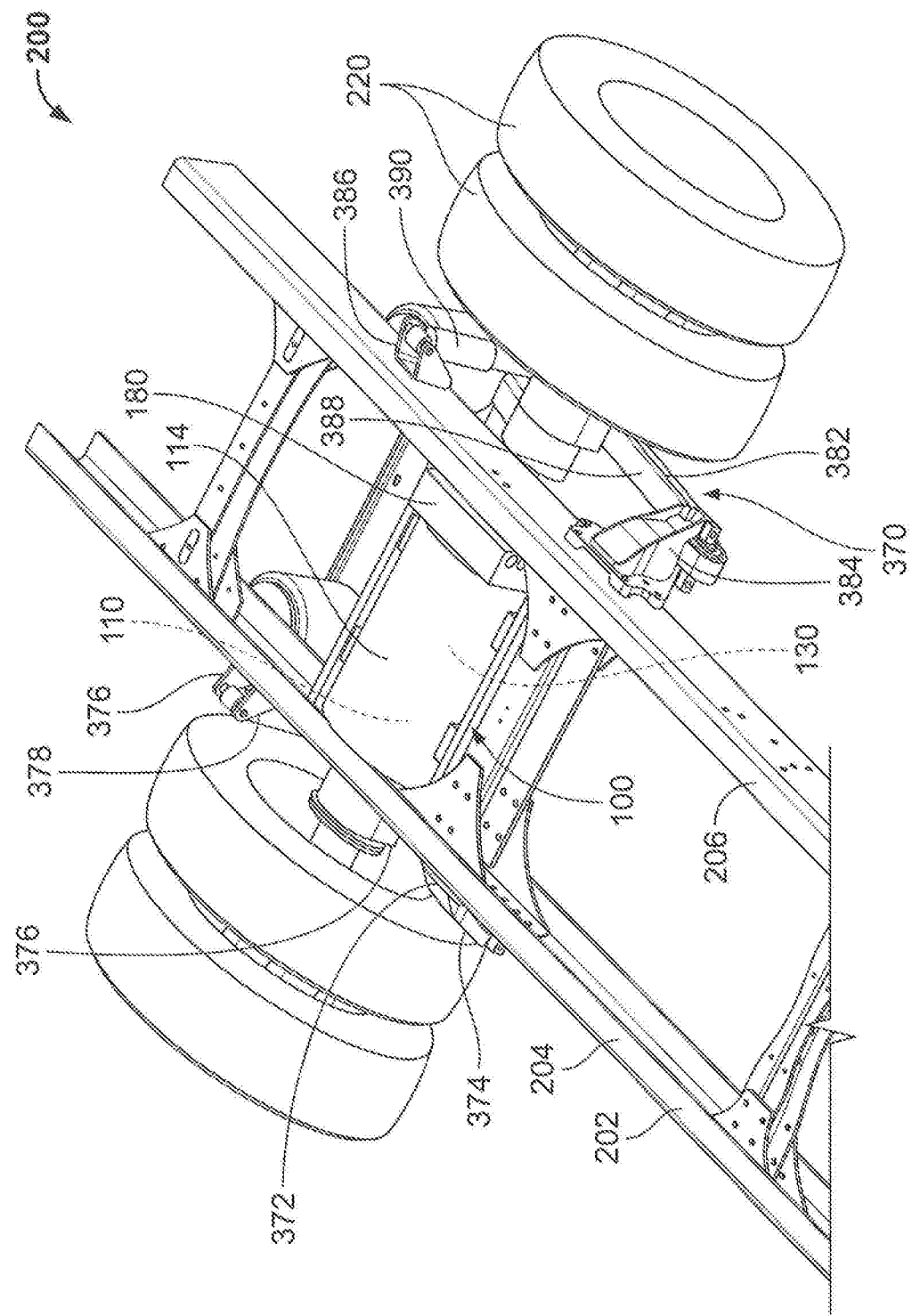
FIG. 3 is a perspective view of the vehicle of FIG. 2 taken from above the vehicle.

Referring now to FIGS. 2-4, the illustrative powertrain 100 is mounted transverse to the chassis 202 and the drive unit 110 and the transmission 130 are offset from the rotational axis RA as discussed above. In the illustrative powertrain mounting arrangement, the drive unit 110 and the transmission 130 at least partially contribute to the sprung mass of the powertrain 100. Additionally, in the illustrative powertrain mounting arrangement, the axle assembly 150 at least partially contributes to the unsprung mass of the powertrain 100.

The illustrative suspension 370 of the vehicle 200 includes a suspension linkage 372 that is mounted to the frame rail 204 of the chassis 202 by mounting brackets 374, 376. The mounting brackets 374, 376 are spaced from one another along the longitudinal axis LA of the chassis 202. The suspension linkage 372 includes an arm 378 that is directly connected to the mounting bracket 374 and a link 380 that is coupled to the arm 378 and directly connected to the mounting bracket 376. In some embodiments, the link 380 may be embodied as, or otherwise include, a hydraulic cylinder, such as a double-acting hydraulic cylinder configured for extension and retraction to adjust a length of the cylinder, for example. Of course, in other embodiments, it should be appreciated that the link 380 may be embodied as, or otherwise include, another suitable device. Additionally, in some embodiments, the arm 378 and the link 380 may be formed as a single component.

The illustrative suspension 370 of the vehicle 200 includes a suspension linkage 382 that is mounted to the frame rail 206 of the chassis 202 by mounting brackets 384, 386. The mounting brackets 384, 386 are spaced from one another along the longitudinal axis LA of the chassis 202. The suspension linkage 382 includes an arm 388 that is directly connected to the mounting bracket 384 and a link 390 that is coupled to the arm 388 and directly connected to the mounting bracket 386. In some embodiments, the link 390 may be embodied as, or otherwise include, a hydraulic cylinder, such as a double-acting hydraulic cylinder configured for extension and retraction to adjust a length of the cylinder, for example. Of course, in other embodiments, it should be appreciated that the link 390 may be embodied as, or otherwise include, another suitable device. Additionally, in some embodiments, the arm 388 and the link 390 may be formed as a single component.

As best seen in FIG. 4, the suspension linkage 372 contacts the wheel mount block 156 and the suspension linkage 382 contacts the wheel mount block 158. Consequently, in use of the vehicle 200, vibrational loads transmitted to the axle assembly 150 (i.e., the wheel mount blocks 156, 158) from the wheels 220 may be applied to the suspension linkages 372, 382. In some embodiments, application of vibrational loads to the suspension linkages 372, 382 may dampen and/or reduce the loads. Additionally, in some embodiments, the suspension linkages 372, 382 may facilitate or enable movement of the axle assembly 150 relative to the chassis 202.

In the illustrative embodiment, the suspension 370 also includes a tray 470 that is coupled to the arms 378, 388 of the corresponding suspension linkages 372, 382. The illustrative tray 470 extends transverse to the longitudinal axis LA of the chassis 202. In some embodiments, the tray 470 and the suspension linkages 372, 382 may cooperate to dampen and/or reduce vibrational loads transmitted to the axle assembly 150 from the wheels 220 in use of the vehicle 200.

Referring now to FIG. 5, interaction between the arms 378, 388 of the suspension linkages 372, 382 and the corresponding mounting brackets 374, 384 is shown in greater detail. The arms 378, 388 are coupled to the corresponding mounting brackets 374, 384 in substantially identical fashion. Using the arm 378 and the mounting bracket 374 as an example, the arm 378 receives a pin 574 of a mounting flange 576 of the mounting bracket 374 such that the arm 378 is secured to the frame rail 204 by the mounting bracket 374.

In the illustrative embodiment, when the powertrain 100 is mounted to the chassis 202, the drive unit 110 and the transmission 130 housed by the housing 114 are arranged above the rotational axis RA relative to a support surface (not shown) on which the wheels 220 are positioned. The illustrative suspension linkages 372, 382 extend at least partially below the rotational axis RA relative to the support surface when the powertrain 100 is mounted to the chassis 202. Additionally, as best seen in FIGS. 5 and 6, the tray 470 is arranged below the rotational RA relative to the support surface when the powertrain 100 is mounted to the chassis 202.

Referring now to FIG. 6, interaction between the links 380, 390 of the suspension linkages 372, 382 and the corresponding mounting brackets 376, 386 is shown in greater detail. The links 380, 390 are coupled to the corresponding mounting brackets 376, 386 in substantially identical fashion. Using the link 380 and the mounting bracket 376 as an example, the mounting bracket 376 receives a mounting flange 680 of the link 380 such that the link 380 is secured to the frame rail 204 by the mounting bracket 376.

The illustrative suspension 370 also includes air springs 670, 672 that are coupled to, and supported on, the tray 470. The air springs 670, 672 contact bottom sides 604, 606 of the respective frame rails 204, 206. In the illustrative embodiment, each of the air springs 670, 672 is embodied as, or otherwise includes, an air bag or air bellow that is fluidly coupled to a source of pressurized air (not shown), such as a blower, a pump, a compressor, or the like whose operation may be driven by the drive unit 110. Additionally, in the illustrative embodiment, each of the air springs 670, 672 is inflatable with pressurized air to adjust a position of the chassis 202 relative to the axle assembly 150.

It should be appreciated that in addition to the wheels 220, suspension linkages 372, 382, the tray 470, and the air springs 670, 672, the illustrative suspension 370 may include other suitable components. For example, in some embodiments, the suspension 370 may include one or more coil or leaf springs, shock absorbers, dampers, torsion bars, struts, additional linkages, axles, beams, or the like. In such embodiments, those components of the suspension 370 may be configured to direct or indirect interaction with the axle assembly 150, as the case may be.

Figure 7:
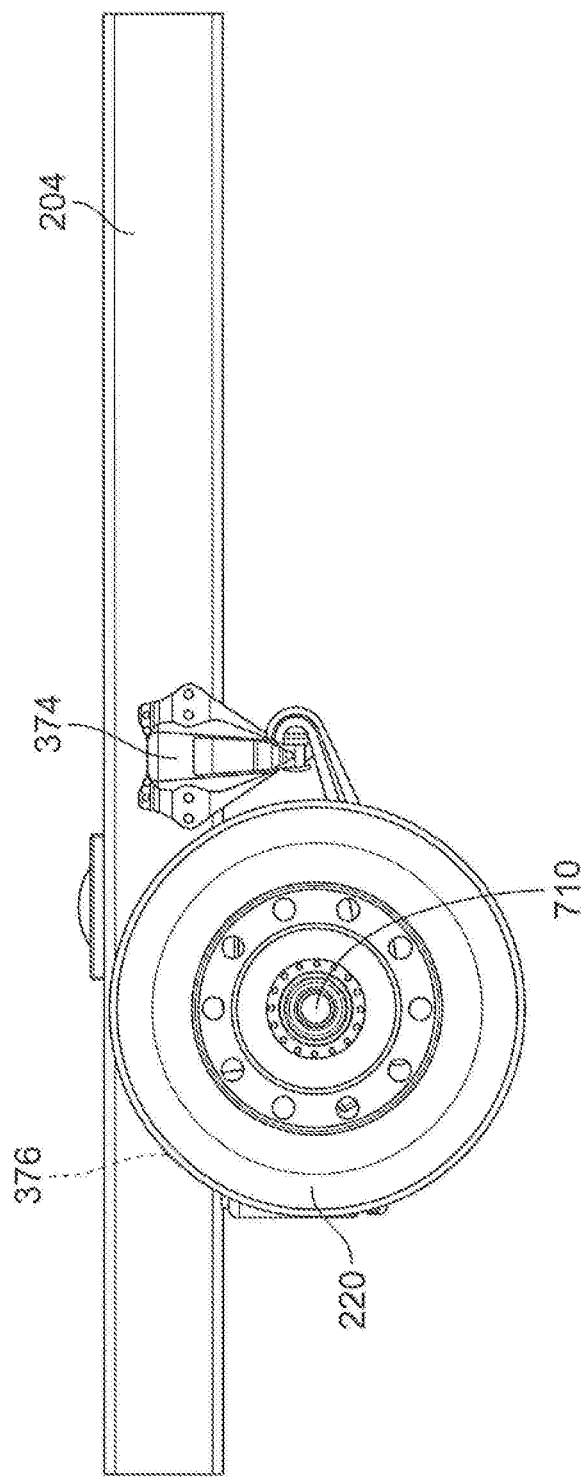
FIG. 7 is an elevation view of the vehicle of the FIG. 2 taken from the side of the vehicle.

Referring now to FIG. 7, in the illustrative embodiment, the mounting bracket 374 is secured to the frame rail 204 in front (i.e., to the right) of a central hub 710 of one of the wheels 220 that is configured for rotation about the rotational axis RA. The mounting bracket 376 is secured to the frame rail 204 behind (i.e., to the left) of the central hub 710. The mounting brackets 384, 386 are secured to the frame rail 206 such that the relative positioning of the mounting brackets 384, 386 is substantially identical to the relative positioning of the mounting brackets 374, 376.

Figure 8:
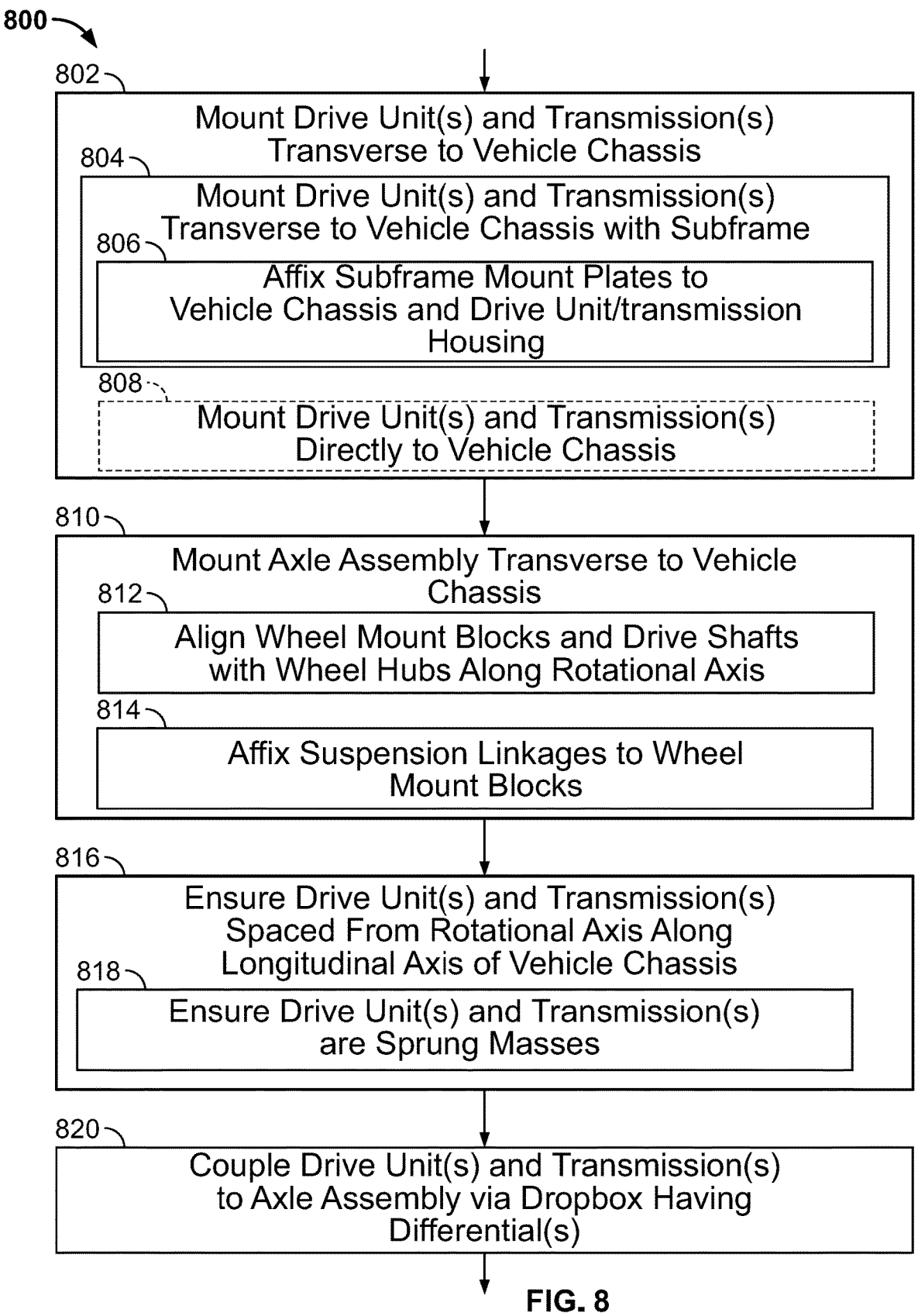
FIG. 8 is a simplified flowchart of a method of mounting the powertrain of FIG. 1 to a vehicle chassis.

Referring now to FIG. 8, an illustrative method 800 of mounting the powertrain 100 to the chassis 202 of the vehicle 200 may be performed manually by a user or automatically (e.g., by a robot). In embodiments in which performance of the method 800 is automated, the method 800 may be embodied as, or otherwise include, a set of instructions that are executable by a control system to perform the blocks of the method 800. In any case, the method 800 corresponds to, or is otherwise associated with, performance of the blocks described below in the illustrative sequence of FIG. 8. It should be appreciated, however, that the method 800 may be performed in one or more sequences different from the illustrative sequence.

The illustrative method 800 begins with block 802. In block 802, the drive unit 110 and the transmission 130 are mounted to the chassis 202 transverse to the longitudinal axis LA. To perform block 802, in the illustrative embodiment, the housing 114 of the drive unit 110 and the transmission 130 is mounted to the chassis 202 with the sub-frame 134 transverse to the longitudinal axis LA in block 804. To perform block 804, block 806 is performed in the illustrative embodiment. In block 806, the mount plates 136, 138 are affixed to the chassis 202 and to the respective sides 116, 118 of the housing 114.

In some embodiments, to perform block 802, the housing 114 of the drive unit 110 and the transmission 130 is mounted directly to the chassis 202 transverse to the longitudinal axis LA in block 808. Of course, it should be appreciated that in such embodiments, the sub-frame 134 may be omitted. Regardless, following performance of block 802, the illustrative method 800 subsequently proceeds to block 810.

In block 810 of the illustrative method 800, the axle assembly 150 is mounted to the chassis 202 transverse to the longitudinal axis LA. To perform block 810, in the illustrative embodiments, blocks 812 and 814 are performed. In block 812, the wheel mount blocks 156, 158 and the drive shafts 152, 154 are aligned with central hubs (e.g., the hub 710) of the wheels 220 along the rotational axis RA. Thus, in block 812, the axle assembly 150 is at least partially aligned with the rotational axis RA of the wheels 220. In block 814, the suspension linkages 372, 382 are affixed to the wheel mount blocks 156, 158 such that the linkages 372, 382 are in contact with the blocks 156, 158. Subsequent to performance of block 810, the illustrative method 800 proceeds to block 816.

In block 816 of the illustrative method 800, it is ensured that the mounted housing 114 of the drive unit 110 and the transmission 130 is spaced from the rotational axis RA of the chassis 202 to isolate the drive unit 110 and the transmission 130 from vibrational loads transmitted to the axle assembly 150 in use of the vehicle 200. In the illustrative embodiment, to perform block 816, block 818 is performed. In block 818, it is ensured that the drive unit 110 and the transmission 130 are sprung masses that at least partially contribute to the sprung mass of the powertrain 100. Following performance of block 816, the illustrative method 800 subsequently proceeds to block 820.

In block 820 of the illustrative method 800, the drive unit 110 and the transmission 130 are coupled to the axle assembly 150 (i.e., the drive shafts 152, 154) via the dropbox 144 having the differential 140. That is, in block 820, the drive unit 110 and the transmission 130 (housed by the housing 114) are coupled to the axle assembly 150 through the differential 140 (housed by the dropbox 144). Accordingly, the dropbox 144 may be coupled to the housing 114 in block 820. In some embodiments, performance of block 820 corresponds to completion of one iteration of the illustrative method 800.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:
1. A vehicle comprising:
a chassis that extends along a longitudinal axis from a first end to a second end arranged opposite the first end;
a plurality of wheels coupled to the chassis between the first end and the second end that are each configured for rotation about a rotational axis;
a powertrain mounted to the chassis transverse to the longitudinal axis between the first end and the second end that is configured to drive rotation of the plurality of wheels about the rotational axis in use of the vehicle, wherein the powertrain includes a drive unit to generate rotational power and a transaxle coupled to the drive unit to receive rotational power therefrom and transmit rotational power to the plurality of wheels, wherein the transaxle includes a transmission and an axle assembly coupled to the transmission having a plurality of drive shafts that extend along the rotational axis and are each coupled to one of the plurality of wheels, and wherein the transmission is spaced from the rotational axis to isolate the transmission from vibrational loads transmitted to the axle assembly in use of the vehicle,
wherein:
the drive unit includes an electric motor and the transmission includes transmission gearing,
the electric motor and the transmission gearing are at least partially enclosed by a common housing, and
the housing is spaced from the rotational axis such that the rotational axis extends perpendicular to the longitudinal axis without passing through the housing to isolate the transmission gearing and the electric motor from vibrational loads transmitted to the axle assembly in use of the vehicle.

2. The vehicle of claim 1, wherein the powertrain includes an inverter coupled to the housing such that the inverter is spaced from the rotational axis to isolate the inverter from vibrational loads transmitted to the axle assembly in use of the vehicle.

3. The vehicle of claim 1, wherein the housing is mounted to the chassis by a sub-frame, and wherein the sub-frame includes a first mount plate affixed to one side of the housing and the chassis and a second mount plate affixed to another side of the housing opposite the one side and the chassis.

4. The vehicle of claim 1, wherein the transaxle includes a differential coupled to the transmission and the plurality of drive shafts of the axle assembly to transmit rotational power from the transmission to the axle assembly, and wherein the differential is housed by a dropbox that extends all the way around the rotational axis.

5. The vehicle of claim 4, wherein the dropbox is coupled to a housing that at least partially encloses the drive unit and the transmission, and wherein the dropbox and the housing are separate components.

6. The vehicle of claim 1, wherein the axle assembly includes a first wheel mount block coupled to a first drive shaft of the plurality of drive shafts and a second wheel mount block coupled to a second drive shaft of the plurality of drive shafts, wherein each of the first and second wheel mount blocks is configured for interaction with one of the plurality of wheels, and wherein each of the first and second wheel mount blocks extends all the way around the rotational axis.

7. The vehicle of claim 6, further comprising a suspension having a first suspension linkage mounted to the chassis and a second suspension linkage mounted to the chassis, and wherein the first suspension linkage contacts the first wheel mount block and the second suspension linkage contacts the second wheel mount block.

8. The vehicle of claim 7, wherein the suspension includes a beam coupled to the first and second wheel mount blocks that is at least partially offset from the rotational axis.

9. The vehicle of claim 6, wherein the transaxle includes a differential coupled between the first and second drive shafts of the axle assembly that is at least partially arranged about the rotational axis.

10. The vehicle of claim 1, wherein the drive unit and the transmission at least partially contribute to a sprung mass of the powertrain and the axle assembly at least partially contributes to an unsprung mass of the powertrain.

11. The vehicle of claim 1, wherein the housing is positioned above the rotational axis in a vertical direction.

12. A powertrain for a vehicle having a chassis that extends along a longitudinal axis from a first end to a second end arranged opposite the first end and a plurality of wheels coupled to the chassis between the first end and the second end that are each configured for rotation about a rotational axis, the powertrain comprising:
   a drive unit to generate rotational power; and
   a transaxle coupled to the drive unit to receive rotational power therefrom and transmit rotational power to the plurality of wheels, wherein the transaxle includes a transmission and an axle assembly coupled to the transmission having a plurality of drive shafts that extend along the rotational axis and are each coupled to one of the plurality of wheels, and wherein the transmission is positioned relative to the rotational axis to isolate the transmission from vibrational loads transmitted to the axle assembly in use of the powertrain,
   wherein:
   the drive unit includes an electric motor and the transmission includes transmission gearing,
   the electric motor and the transmission gearing are at least partially enclosed by a common housing, and
   the housing is offset from the rotational axis without being positioned on the rotational axis to isolate the transmission gearing and the electric motor from vibrational loads transmitted to the axle assembly in use of the powertrain.

13. The powertrain of claim 12, further comprising an inverter coupled to the housing such that the inverter is positioned relative to the rotational axis to isolate the inverter from vibrational loads transmitted to the axle assembly in use of the powertrain.

14. The powertrain of claim 12, wherein the transaxle includes a differential coupled to the transmission and the plurality of drive shafts of the axle assembly to transmit rotational power from the transmission to the axle assembly, wherein the differential is housed by a dropbox that extends all the way around the rotational axis, and wherein the dropbox is coupled to the housing.

15. The powertrain of claim 12, wherein the axle assembly includes a first wheel mount block coupled to a first drive shaft of the plurality of drive shafts and a second wheel mount block coupled to a second drive shaft of the plurality of drive shafts, wherein each of the first and second wheel mount blocks is configured for interaction with one of the plurality of wheels, and wherein each of the first and second wheel mount blocks extends all the way around the rotational axis.

16. The powertrain of claim 15, wherein in use of the powertrain, each one of the first and second wheel mount blocks contacts a suspension linkage of a suspension of the vehicle.

17. The powertrain of claim 12, wherein the housing is positioned above the rotational axis in a vertical direction.

18. A method of mounting a powertrain to a chassis of a vehicle, the method comprising:
   mounting a drive unit of the powertrain and a transmission of the powertrain to the chassis such that the mounted drive unit and the mounted transmission are transverse to a longitudinal axis defined by the chassis;
   mounting an axle assembly of the powertrain to the chassis such that the mounted axle assembly is transverse to the longitudinal axis and at least partially aligned with a rotational axis of at least one of a plurality of wheels of the vehicle; and
   ensuring the mounted drive unit and the mounted transmission are positioned above the rotational axis in a vertical direction to isolate the mounted drive unit and the mounted transmission from vibrational loads transmitted to the axle assembly in use of the vehicle,
   wherein:
   the drive unit includes an electric motor and the transmission includes transmission gearing,
   the electric motor and the transmission gearing are at least partially enclosed by a common housing, and
   the housing is spaced from the rotational axis such that the rotational axis extends perpendicular to the longitudinal axis without passing through the housing.

19. The method of claim 18, wherein mounting the drive unit of the powertrain and the transmission of the powertrain to the chassis comprises mounting the drive unit and the transmission to the chassis with a sub-frame, and wherein mounting the drive unit and the transmission to the chassis with the sub-frame includes affixing mount plates of the sub-frame to the chassis and a housing common to the drive unit and the transmission.

20. The method of claim 19, wherein mounting the axle assembly of the powertrain to the chassis comprises aligning wheel mount blocks and drive shafts of the axle assembly with the plurality of wheels along the rotational axis and affixing suspension linkages of a suspension of the vehicle to the wheel mount blocks.

\* \* \* \* \*